United States Patent
Nokes et al.

(10) Patent No.: US 6,805,304 B1
(45) Date of Patent: Oct. 19, 2004

(54) MOBILE CHEMICAL SPRAYER

(76) Inventors: James L. Nokes, 1063 N. 1300 East, Layton, UT (US) 84040; Billy J. Smith, 1063 N. 1300 E., Layton, UT (US) 84040

( * ) Notice: Subject to any disclaimer, the term of this patent is extended or adjusted under 35 U.S.C. 154(b) by 218 days.

(21) Appl. No.: 10/119,754

(22) Filed: Apr. 9, 2002

(51) Int. Cl.$^7$ .............................. B05B 9/03; B05B 1/20
(52) U.S. Cl. ...................... 239/146; 239/147; 239/150; 239/159; 239/722; 239/754
(58) Field of Search ................................ 239/146, 147, 239/150, 151, 159, 280, 532, 722, 754

(56) References Cited

U.S. PATENT DOCUMENTS

| | | | | |
|---|---|---|---|---|
| 1,658,283 A | * | 2/1928 | Camden | 239/150 |
| 2,243,610 A | * | 5/1941 | Spreng | 239/722 |
| 2,275,594 A | * | 3/1942 | Perry | 239/145 |
| 3,064,904 A | * | 11/1962 | Roberts | 239/754 |
| 3,153,509 A | * | 10/1964 | Curtis | 239/172 |
| 4,828,177 A | * | 5/1989 | Schuitemaker | 239/165 |
| 6,045,067 A | * | 4/2000 | Foster | 239/754 |

FOREIGN PATENT DOCUMENTS

| | | | | |
|---|---|---|---|---|
| EP | | 178065 A1 | * 4/1986 | A01C/19/04 |

* cited by examiner

*Primary Examiner*—Robin O. Evans

(57) ABSTRACT

Mobile chemical sprayers dispense liquid chemicals over a large area, such as a lawn or garden, in a short period of time. Individuals applying chemicals are not tethered to a fixed tank by a long hose, but can instead continuously move and apply chemicals simultaneously using a mobile chemical sprayer. This facilitates a more uniform distribution of chemical, and eliminates the need to spend time moving the tank or repositioning the hose.

2 Claims, 3 Drawing Sheets

MOBILE CHEMICAL SPRAYER

BACKGROUND OF THE INVENTION

1. Field of the Invention

The present invention relates to a mobile chemical sprayer for use in connection with agriculture and lawn care. The mobile chemical sprayer has particular utility in connection with dispersion of liquid chemicals over a lawn or garden.

2. Description of the Prior Art

Mobile chemical sprayers are desirable for dispensing liquid chemicals over a large area, such as a lawn or garden, in a short period of time. Individuals applying chemicals are not tethered to a fixed tank by a long hose, but can instead continuously move and apply chemicals simultaneously using a mobile chemical sprayer. This facilitates a more uniform distribution of chemical, and eliminates the need to spend time moving the tank or repositioning the hose.

The use of sprayers is known in the prior art. For example, U.S. Pat. No. 3,976,231 to Betulius discloses a hand-propelled chemical applicator. However, the Betulius '231 patent does not have a rest bar in front, rendering its nozzles vulnerable to damage, and has further drawbacks of lacking a battery-operated pump.

U.S. Pat. No. 4,669,662 to Bruce discloses a mobile spray apparatus that sprays a liquid chemical. However, the Bruce '662 patent does not have a rest bar in front, rendering its nozzles vulnerable to damage, and additionally does not have a handle bar to facilitate manual operation.

Similarly, U.S. Pat. No. Des. 307,589 to Ridgeon discloses a sprayer. However, the Ridgeon '589 patent does not have a rest bar in front, and also does not have a pump switch on a handle bar.

Additionally, U.S. Pat. No. 4,269,356 to Rose discloses a portable agricultural sprayer that sprays a chemical within rows of plants. However, the Rose '356 patent does not have a pump switch on a handle bar, and has the additional deficiency of a more complex spraying mechanism, rendering the sprayer more expensive to manufacture and more vulnerable to failure.

Furthermore, U.S. Pat. No. 4,865,255 to Luvisotto discloses a self-contained, mobile spraying apparatus that sprays a liquid chemical. However, the Luvisotto '255 patent cannot continuously move while simultaneously spraying chemical, and has the additional deficiency of having two wheels, thereby adding additional weight and rolling resistance.

Lastly, U.S. Pat. No. 5,695,121 to Stillions, Jr. et al. discloses a self-contained portable sprayer system that sprays a fluid. However, the Stillions, Jr. et al. '121 patent does not have a pump switch on a handle bar, and has the additional disadvantage of maintaining the fluid under pressure, thereby creating a potential explosion hazard.

While the above-described devices fulfill their respective, particular objectives and requirements, the aforementioned patents do not describe a mobile chemical sprayer that allows dispersion of liquid chemicals over a lawn or garden. The Betulius '231 patent, the Bruce '662 patent, and the Ridgeon '589 patent make no provision for a rest bar in front to protect the nozzles. The Ridgeon '589 patent, the Rose '356 patent, and the Stillions, Jr. et al. '121 patent do not have a pump switch located on a handle bar. Also, the Luvisotto '255 patent cannot continuously move while simultaneously spraying chemical.

Therefore, a need exists for a new and improved mobile chemical sprayer that can be used for dispersion of liquid chemicals over a lawn or garden. In this regard, the present invention substantially fulfills this need. In this respect, the mobile chemical sprayer according to the present invention substantially departs from the conventional concepts and designs of the prior art, and in doing so provides an apparatus primarily developed for the purpose of dispersion of liquid chemicals over a lawn or garden.

SUMMARY OF THE INVENTION

In view of the foregoing disadvantages inherent in the known types of sprayers now present in the prior art, the present invention provides an improved mobile chemical sprayer, and overcomes the above-mentioned disadvantages and drawbacks of the prior art. As such, the general purpose of the present invention, which will be described subsequently in greater detail, is to provide a new and improved mobile chemical sprayer which has all the advantages of the prior art mentioned heretofore and many novel features that result in a mobile chemical sprayer which is not anticipated, rendered obvious, suggested, or even implied by the prior art, either alone or in any combination thereof.

To attain this, the present invention essentially comprises a frame and an attached sprayer. The frame may take the form of metal tubing, a metal fork, and a bicycle wheel attached to the metal fork. The sprayer may take the form of a battery-operated pump, a battery, a tank, one or more hoses to feed fluid from the tank to the pump, nozzles, and a hose to feed fluid from the pump to the nozzles.

There has thus been outlined, rather broadly, the more important features of the invention in order that the detailed description thereof that follows may be better understood and in order that the present contribution to the art may be better appreciated.

The invention may also include a tank with straps that can be worn by the user. There may also be a support bar and rest bar mounted in the front of the mobile chemical sprayer to protect the nozzles. There may also be a handle bar with an attached pump switch, hose connector, and bar grips as part of the frame. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mobile chemical sprayer that has all of the advantages of the prior art sprayers and none of the disadvantages.

It is another object of the present invention to provide a new and improved mobile chemical sprayer that may be easily and efficiently manufactured and marketed.

An even further object of the present invention is to provide a new and improved mobile chemical sprayer that has a low cost of manufacture with regard to both materials and labor, and which accordingly is then susceptible of low prices of sale to the consuming public, thereby making such mobile chemical sprayer economically available to the buying public.

Still another object of the present invention is to provide a new mobile chemical sprayer that provides in the apparatuses and methods of the prior art some of the advantages thereof, while simultaneously overcoming some of the disadvantages normally associated therewith.

Even still another object of the present invention is to provide a mobile chemical sprayer for dispersion of liquid chemicals over a lawn or garden. This allows the user to continuously spray chemical while simultaneously moving.

Still yet another object of the present invention is to provide a mobile chemical sprayer for dispersion of liquid chemicals over a lawn or garden. This makes it possible to turn the pump on and off while grasping the handle bar.

An additional object of the present invention is to provide a mobile chemical sprayer for dispersion of liquid chemicals over a lawn or garden. This makes it possible pump fluid without additional manual effort by the user.

A further object of the present invention is to provide a mobile chemical sprayer for dispersion of liquid chemicals over a lawn or garden. This reduces the risk of explosion of a pressurized tank since one is not employed.

A still further object of the present invention is to provide a mobile chemical sprayer for dispersion of liquid chemicals over a lawn or garden. This protects the nozzles from damage when the mobile chemical sprayer is not in use.

Lastly, it is an object of the present invention to provide a new and improved mobile chemical sprayer for dispersion of liquid chemicals over a lawn or garden.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
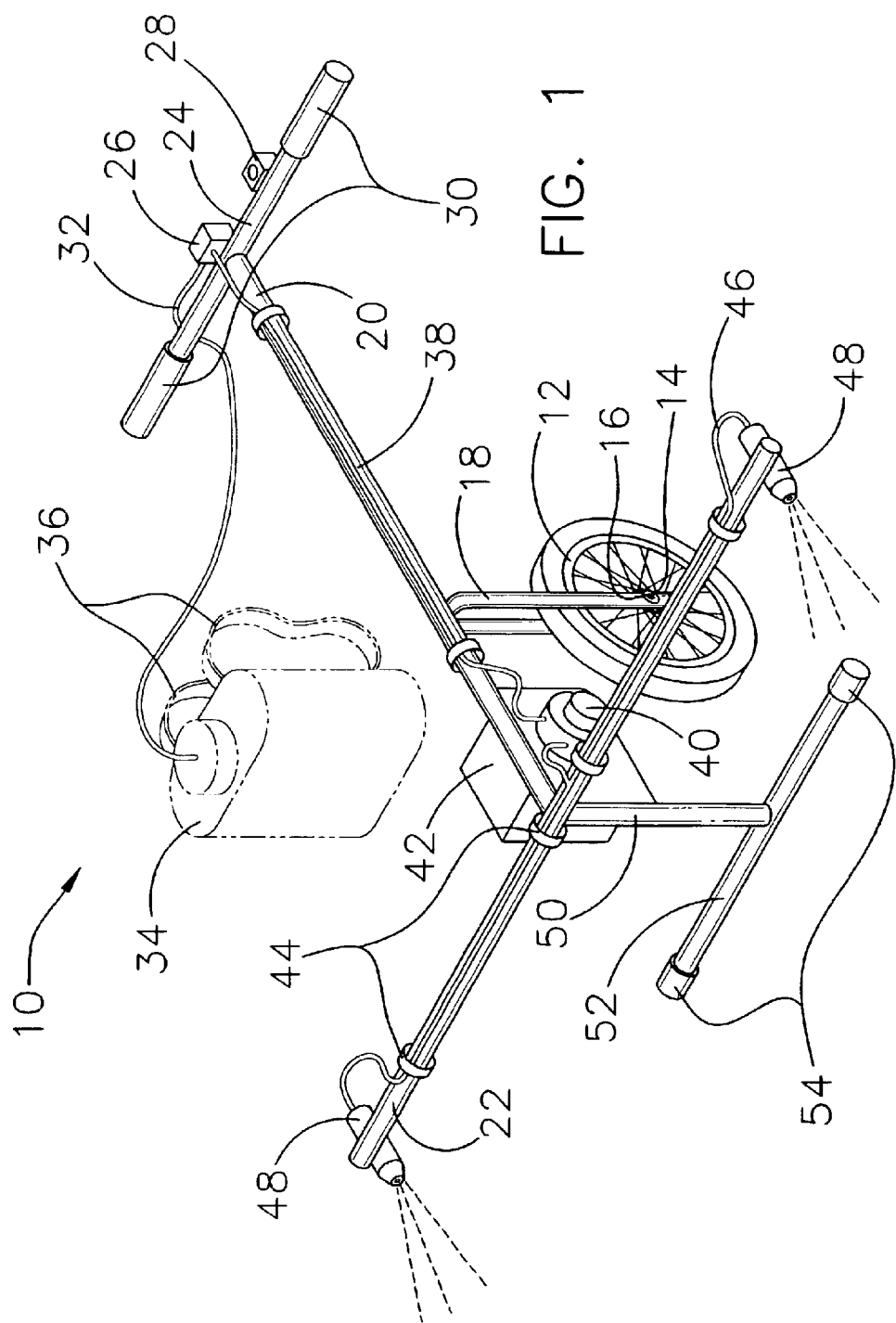
FIG. 1 is a front perspective view of the current embodiment of the mobile chemical sprayer constructed in accordance with the principles of the present invention.
Figure 2:
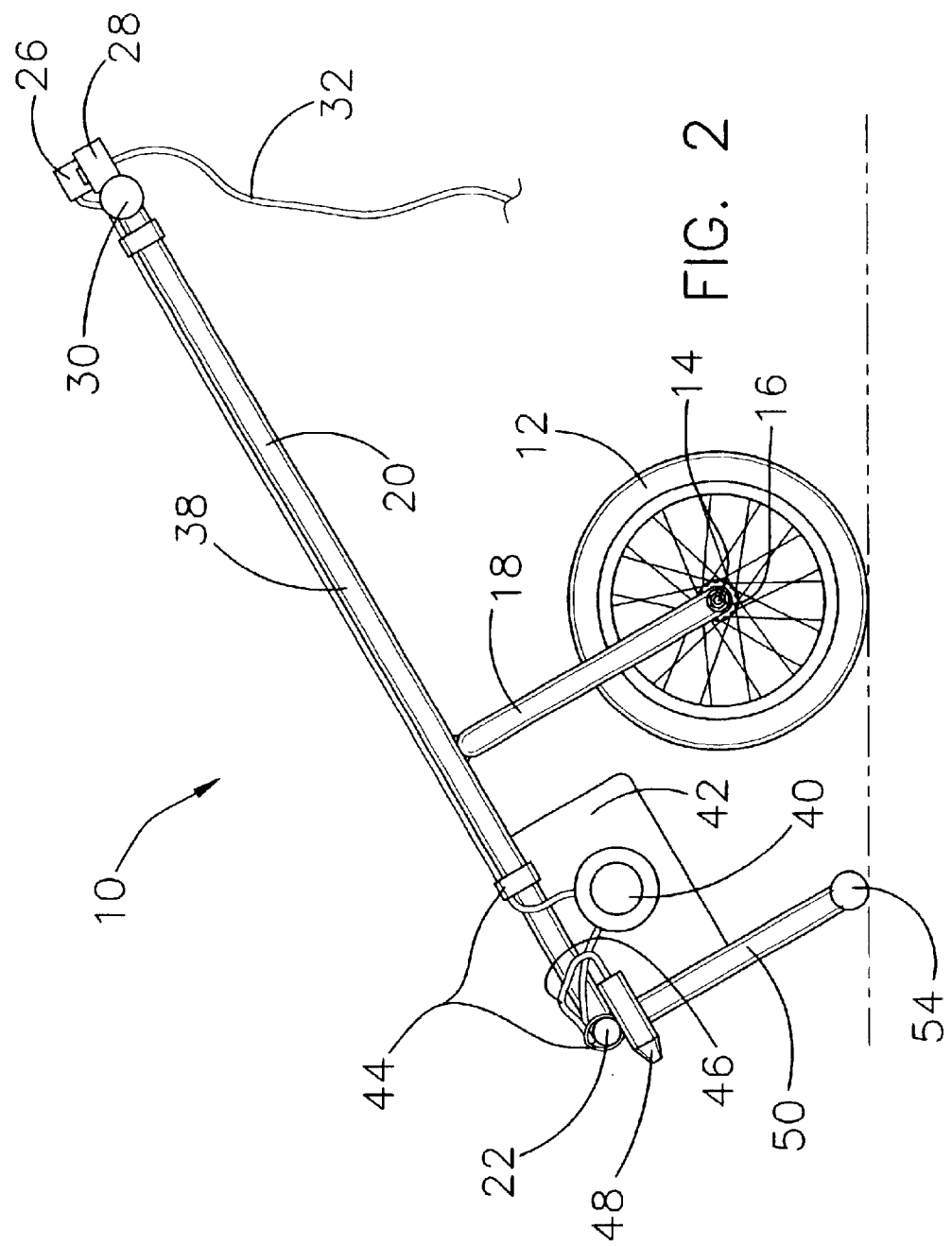
FIG. 2 is a side view of the mobile chemical sprayer of the present invention.
Figure 3:
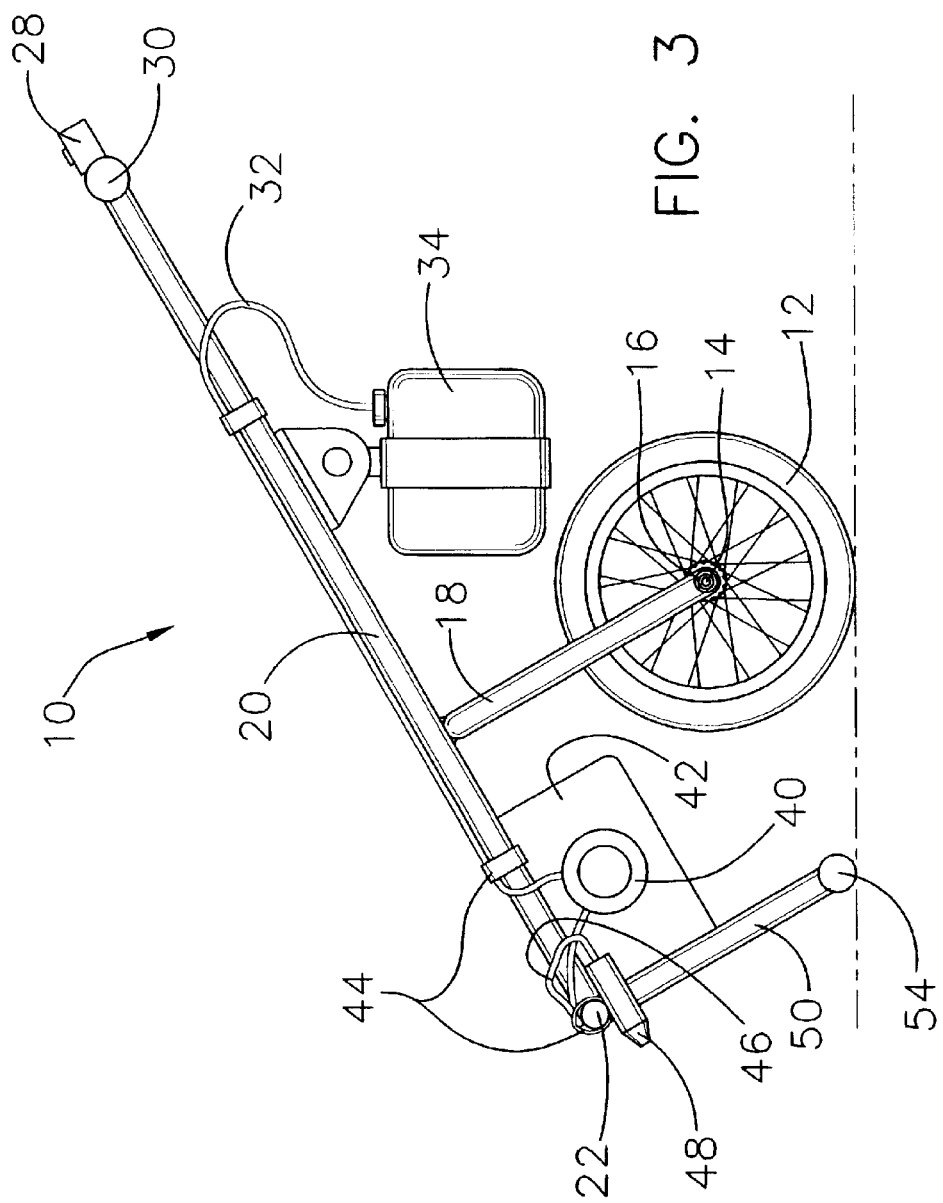
FIG. 3 is a side view of the mobile chemical sprayer of the present invention.

Referring now to the drawings, and particularly to FIGS. 1–3, a current embodiment of the mobile chemical sprayer of the present invention is shown and generally designated by the reference numeral 10.

In FIG. 1, a new and improved mobile chemical sprayer 10 of the present invention for dispersion of liquid chemicals over a lawn or garden is illustrated and will be described. More particularly, the mobile chemical sprayer 10 has a bicycle wheel 12 attached to fork 18 made of steel tubing by axle 14 and nut 16, both made of steel. Welded to fork 18 is steel body tube 20. Welded to one end of body tube 20 is steel spray tube 22. Welded to the opposite end of body tube 20 is handle bar 24 made from steel tubing. Frictionally engaged with handle bar 24 are bar grips 30 made of rubber. Attached to handle bar 24 are hose connector 26 and pump switch 28. Pump hose 38 is connected to hose connector 26 at one end and pump 40 at the other end. Pump hose 38 is also attached to body tube 20 by hose grips 44. Battery 42 is attached to body tube 20 and pump 40. Spray hose 46 is connected at one end to pump 40 and at its other end to nozzles 48. Spray hose 46 is also connected to spray tube 22 by hose grips 44. Nozzles 48 are connected to spray tube 22 as well. Welded to spray tube 22 is support bar 50 made from steel tubing. Welded to support bar 50 is rest bar 52, also made of steel tubing. Frictionally engaged with the ends of rest bar 52 are end caps 54 made from plastic.

Moving on to FIG. 2, a new and improved mobile chemical sprayer 10 of the present invention for dispersion of liquid chemicals over a lawn or garden is illustrated and will be described. More particularly, the mobile chemical sprayer 10 has a bicycle wheel 12 attached to fork 18 by axle 14 and nut 16. Body tube 20 is shown attached to fork 18 with bar grips 30, pump switch 28, and hose connector 26 attached to one end. On the opposite end of body tube 20 attached spray tube 22 with nozzle 48, support bar 50, and end cap 54. Also attached to body tube 20 is battery 42. Attached to battery 42 is pump 40. Tank hose 32 is attached at one end to hose connector 26. Pump hose 38 is secured to body tube 20 by hose grips 44 and conveys fluid from hose connector 26 to pump 40. Spray hose 46 is secured to spray tube 22 by hose grips 44 and conveys fluid from pump 40 to nozzle 48.

Concluding with FIG. 3, a new and improved mobile chemical sprayer 10 of the present invention for dispersion of liquid chemicals over a lawn or garden is illustrated and will be described. More particularly, the mobile chemical sprayer 10 has a bicycle wheel 12 attached to fork 18 by axle 14 and nut 16. Body tube 20 is shown connected to fork 18 with bar grip 30 and pump switch 28 at one end. At the opposite end of body tube 20 is spray tube 22 with attached nozzle 48, support bar 50, and end cap 54. Hanging from body tube 20 is tank 34 with tank hose 32 conveying fluid from tank 34 to pump 40. Tank hose 32 is secured to body tube 20 by hose grips 44. Battery 42 is attached to body tube 20. Spray hose 46 conveys fluid from pump 40 to nozzle 48 and is secured to spray tube 22 by hose grip 44.

While a current embodiment of the mobile chemical sprayer has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as aluminum, titanium, plastic, or wood may be used instead of the steel tubing described. Also, the hoses may be contained within the tubing, eliminating the need for hose grips. Furthermore, a wide variety of wheels may be used instead of the bicycle wheel described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A mobile chemical sprayer comprising:

a bicycle wheel;

an axle having opposing ends inserted through said bicycle wheel;

a fork resting on said axle;

an axle locking mechanism attached to said opposing ends of said axle;

a body tube having opposing ends attached to said fork;

a spray tube attached to said end of said body tube;

a support bar attached to said spray tube;

a rest bar attached to said support bar; and a sprayer attached to said body tube and said spray tube; wherein said sprayer comprises:

a nozzle;

a feeder hose having opposing ends with one attached to said nozzle;

a pump attached to said opposing end of said feeder hose;

a pump hose having opposing ends with one end attached to said pump;

a hose connector connected to said opposing end of said pump hose;

a tank hose having opposing ends with one end attached to said pump; and a lank connected to said opposing end of said tank hose.

2. A mobile chemical sprayer comprising:

a bicycle wheel;

an axle having opposing ends inserted through said bicycle wheel;

a fork resting on said axle;

an axle locking mechanism attached to said opposing ends of said axle;

a body tube having opposing ends attached to said fork;

a spray tube attached to said end of said body tube;

a handle bar attached to said opposing end of said body tube;

a support bar attached to said spray tube;

a rest bar attached to said support bar;

a nozzle attached to said spray tube;

a feeder hose having opposing ends with one attached to said nozzle;

a pump attached to said opposing end of said feeder hose;

a battery attached to said pump;

a pump switch attached to said handle bar;

a pump hose having opposing ends with one end attached to said pump;

a hose connector connected to said opposing end of said pump hose;

a tank hose having opposing ends with one end attached to said hose connector; and a tank connected to said opposing end of said tank hose.

* * * * *